US008085302B2

(12) United States Patent
Zhang et al.

(10) Patent No.: US 8,085,302 B2
(45) Date of Patent: Dec. 27, 2011

(54) COMBINED DIGITAL AND MECHANICAL TRACKING OF A PERSON OR OBJECT USING A SINGLE VIDEO CAMERA

(75) Inventors: Cha Zhang, Sammamish, WA (US); Li-wei He, Redmond, WA (US); Yong Rui, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1346 days.

(21) Appl. No.: 11/284,496

(22) Filed: Nov. 21, 2005

(65) Prior Publication Data
US 2007/0120979 A1 May 31, 2007

(51) Int. Cl.
*H04N 5/225* (2006.01)
(52) U.S. Cl. ......... 348/169; 348/155; 348/154; 348/143
(58) Field of Classification Search .................. 348/154, 348/155, 143, 169
See application file for complete search history.

(56) References Cited

U.S. PATENT DOCUMENTS

| | | | | |
|---|---|---|---|---|
| 5,384,594 | A * | 1/1995 | Sieber et al. | 348/169 |
| 5,438,357 | A * | 8/1995 | McNelley | 348/14.1 |
| 2002/0196327 | A1* | 12/2002 | Rui et al. | 348/14.11 |
| 2006/0075448 | A1* | 4/2006 | McAlpine et al. | 725/105 |

OTHER PUBLICATIONS

Haoran Yi, Deepu Rajan, Liang-Tien Chia, Sep. 7, 2004, Center for Multimedia and Network Technology, Science Direct, pp. 1-11.*

Haoran Yi et al, Sep. 7, 2004, Center for Multimedia and Network Technology, Science Direct, pp. 1-11.*

Comaniciu, D., and V. Ramesh, Robust detection and tracking of human faces with an active camera, *Proc. of the 3rd IEEE Int'l Workshop on Visual Surveillance*, Dublin, Ireland, Jul. 2000, pp. 11-18.

Rui, Y., A. Gupta, J. Grudin, Videography for telepresentations, *Proc. of the SIGCHI Conf. on Human Factors in Computing Sys.*, 2003, Ft. Lauderdale, FL, pp. 457-464.

Yang, J., and A. Waibel, A real-time face tracker, *Proc. of the 3rd IEEE Workshop on Applications of Computer Vision*, (WACV '96), Dec. 2-4, 1996, pp. 142-147.

* cited by examiner

*Primary Examiner* — King Poon
*Assistant Examiner* — Jamares Q Washington
(74) *Attorney, Agent, or Firm* — Lyon & Harr, LLP; Richard T. Lyon

(57) ABSTRACT

A combined digital and mechanical tracking system and process for generating a video using a single digital video camera that tracks a person or object of interest moving in a scene is presented. This generally involves operating the camera at a higher resolution than is needed for the application, and cropping a sub-region out of the image captured that is output as the output video. The person or object being tracked is at least partially contained within the cropped sub-region. As the person or object moves within the field of view of the camera, the location of the cropped sub-region is also moved so as to keep the subject of interest within its boundaries. When the subject of interest moves to the boundary of the FOV of the camera, the camera is mechanically panned to keep the person or object inside its FOV.

19 Claims, 12 Drawing Sheets

COMBINED DIGITAL AND MECHANICAL TRACKING OF A PERSON OR OBJECT USING A SINGLE VIDEO CAMERA

BACKGROUND

Online broadcasting of lectures and presentations, live or on demand, is increasingly popular in universities and corporations as a way of overcoming temporal and spatial constraints on live attendance. For instance, at Stanford University, lectures from over 50 courses are made available online every quarter. University of California at Berkeley has developed online learning programs with "Internet classrooms" for a variety of courses. Columbia University provides various degrees and certificate programs through its e-learning systems. These types of on-line learning systems typically employ an automated lecture capturing system and a web interface for watching seminars online. FIG. 1 shows a screen shot of one such web interface 10. On the left hand side, there is a display sector 12 showing a video stream generated by the automated lecture capturing system being employed at the lecture site. Typically, this display is an edited video switching among a speaker view, an audience view, a local display screen view and an overview of the lecture room. Presentation slides of the lecture are displayed on the right in a slide sector 14 of the interface 10. The automated lecture capturing systems can vary greatly in their makeup. However, a typical example would include several analog cameras. For example, two cameras could be mounted in the back of the lecture room for tracking the speaker. A microphone array/camera combo could be placed on the podium for finding and capturing the audience. In some capture systems, each camera is considered a virtual cameraman (VC). These VCs send their videos to a central virtual director (VD), which controls an analog video mixer to select one of the streams as output.

Despite their success, these automated lecture capturing systems have limitations. For example, it is difficult to transport the system to another lecture room. In addition, analog cameras not only require a lot of wiring work, but also need multiple computers to digitize and process the captured videos. These limitations are partly due to the need for two cameras to track the speaker in many existing capture systems. One of these cameras is a static camera for tracking the lecturer's movement. It has a wide horizontal field of view (FOV) and can cover the whole frontal area of the lecture room. The other camera is a pan/tilt/zoom (PTZ) camera for capturing images of the lecturer. Tracking results generated from the first camera are used to guide the movement of the second camera so as to keep the speaker at the center of the output video. This dual camera system can work well, however it tends to increase the cost and the wiring/hardware complexity.

It is noted that while the foregoing limitations in existing automated lecture capturing systems can be resolved by a particular implementation of a combined tracking system and process according to the present invention, this system and process is in no way limited to implementations that just solve any or all of the noted disadvantages. Rather, the present system and process has a much wider application as will become evident from the descriptions to follow.

SUMMARY

The present invention is directed toward a combined digital and mechanical tracking system and process for generating a video using a single digital video camera that tracks a person or object of interest moving in a scene. This is generally accomplished by operating the camera at a higher resolution than is needed for the application for which it is being employed, and cropping a sub-region out of the image captured that is output as the output video. The person or object being tracked is at least partially contained within the cropped sub-region. As the person or object moves within the field of view (FOV) of the camera, the location of the cropped sub-region is also moved so as to keep the subject of interest within its boundaries. When the subject of interest moves to the boundary of the FOV of the camera, the camera is mechanically panned to keep the person or object inside its FOV. As such tracking involves a combined digital and mechanical scheme.

One implementation of this combined digital and mechanical tracking technique involves, on a periodic basis, first detecting movement of the person or object being tracked in the last video frame captured by the video camera. It is then determined if the detected motion indicates the person or object is shown completely within a prescribed-sized portion the last frame captured. If it does, then a cropping region, which is the aforementioned prescribed-sized sub-region of the last frame that shows at least part of the person or object of interest, is established. This feature of finding the person or object being tracked within the last-captured frame of the video camera and establishing the cropping region is referred to as digitally tracking the person or object. However, if the detected motion indicates the person or object being tracked is not shown completely within the prescribed-sized portion the last frame captured, then the video camera is mechanically panned, with some possible exceptions, so as to show at least part of the subject of interest in a cropping region established in the last frame captured by the video camera after the mechanical panning is complete. The process of mechanically panning the camera to establish a cropping region containing the person or object of interest is referred to as mechanically tracking the person or object. Regardless of whether a digital or mechanical panning has occurred, the established cropping region is designated as the next frame of the video being generated. Thus, at each periodic time instance, another frame of the video is produced, showing the person or object of interest moving through the scene.

It should be noted that this Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter. In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

DETAILED DESCRIPTION

In the following description of embodiments of the present invention reference is made to the accompanying drawings which form a part hereof, and in which are shown, by way of illustration, specific embodiments in which the invention may be practiced. It is understood that other embodiments may be utilized and structural changes may be made without departing from the scope of the present invention.

1.0 The Computing Environment

Figure 1:
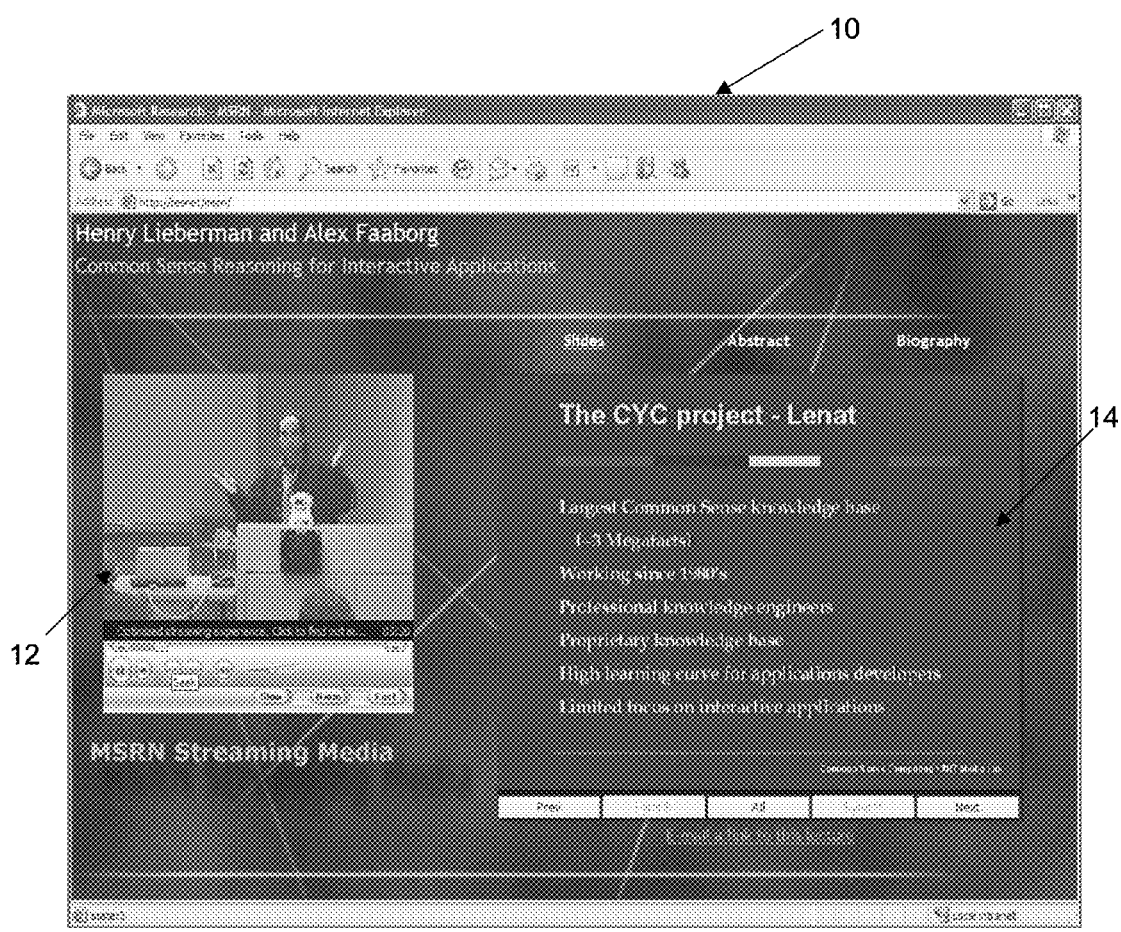
FIG. 1 is a screen shot of a web interface for watching seminars online.
Figure 2:
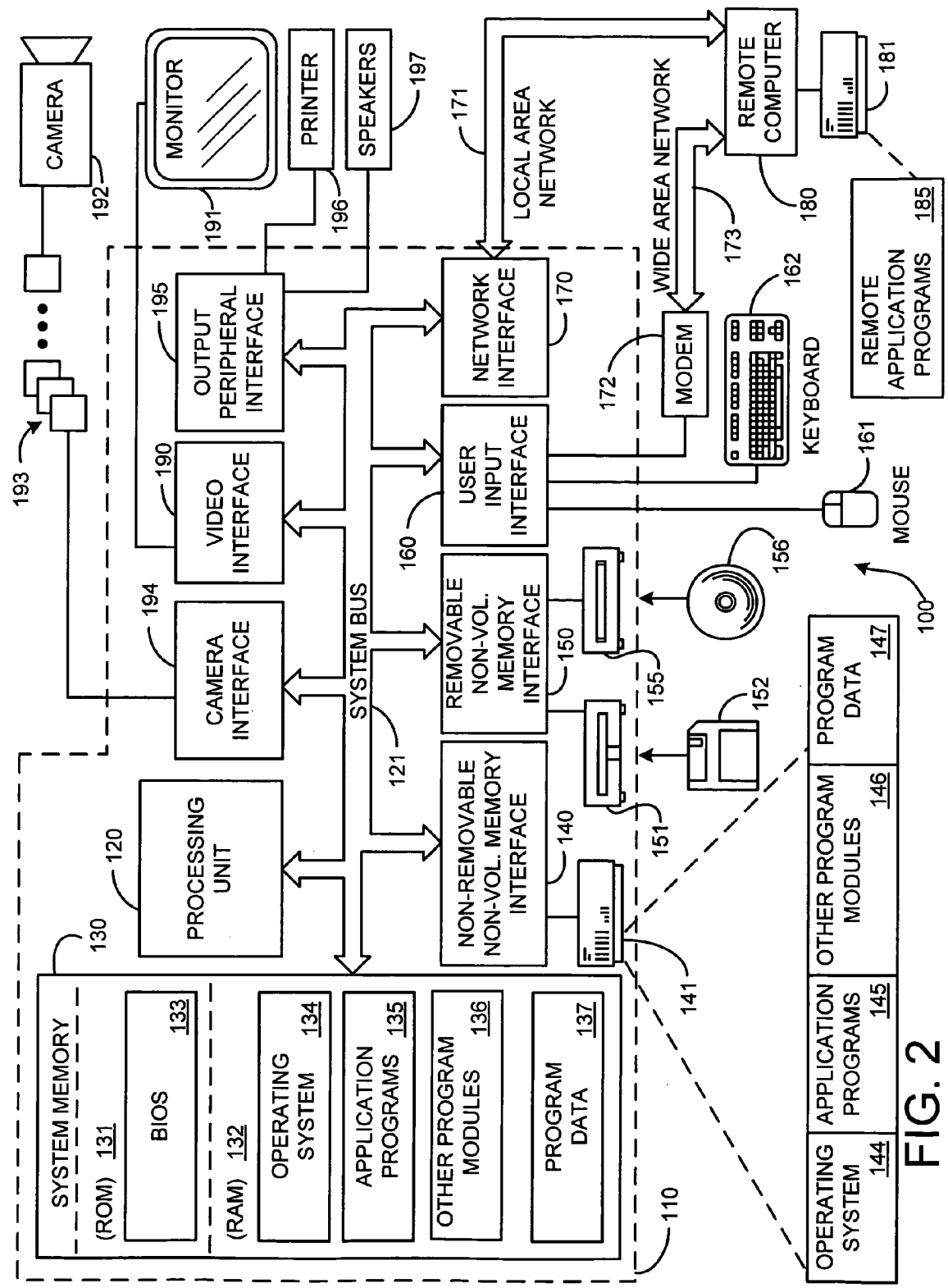
FIG. 2 is a diagram depicting a general purpose computing device constituting an exemplary system for implementing the present invention.

Before providing a description of embodiments of the present invention, a brief, general description of a suitable computing environment in which portions of the invention may be implemented will be described. FIG. 1 illustrates an example of a suitable computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. A camera 192 (such as a digital/electronic still or video camera, or film/photographic scanner) capable of capturing a sequence of images 193 can also be included as an input device to the personal computer 110. Further, while just one camera is depicted, multiple cameras could be included as input devices to the personal computer 110. The images 193 from the one or more cameras are input into the computer 110 via an appropriate camera interface 194. This interface 194 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 192.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining parts of this description section will be devoted to a description of the program modules embodying the invention.

2.0 The Combined Digital and Mechanical Tracking System and Process

The present combined digital and mechanical tracking system and process involves using a single digital video camera to track a person or object. This is accomplished by operating the camera at a higher resolution than is needed for the application for which it is being employed, and cropping a sub-region out of the image captured that is output as the output video. The person or object being tracked is at least partially shown within the cropped sub-region. As the person or object moves within the field of view (FOV) of the camera, the location of the cropped sub-region is also moved so as to keep the subject of interest within its boundaries. When the subject of interest moves to the boundary of the FOV of the camera, the camera is mechanically panned to keep the person or object inside its FOV. As such, the tracking involves a combined digital and mechanical scheme.

In the context of the previously-described limitations of existing automated lecture capturing systems, it can be seen that much of the cost and complexity of a dual, analog video camera tracking set-up is eliminated by the use of a single, digital PTZ video camera. For example, a network-type digital video camera can be employed, which takes advantage of existing Ethernet connections. In this way much of the wiring is eliminated and the system becomes much more portable. In addition, the digital nature of the camera eliminates any need for digitizing.

Figure 3:
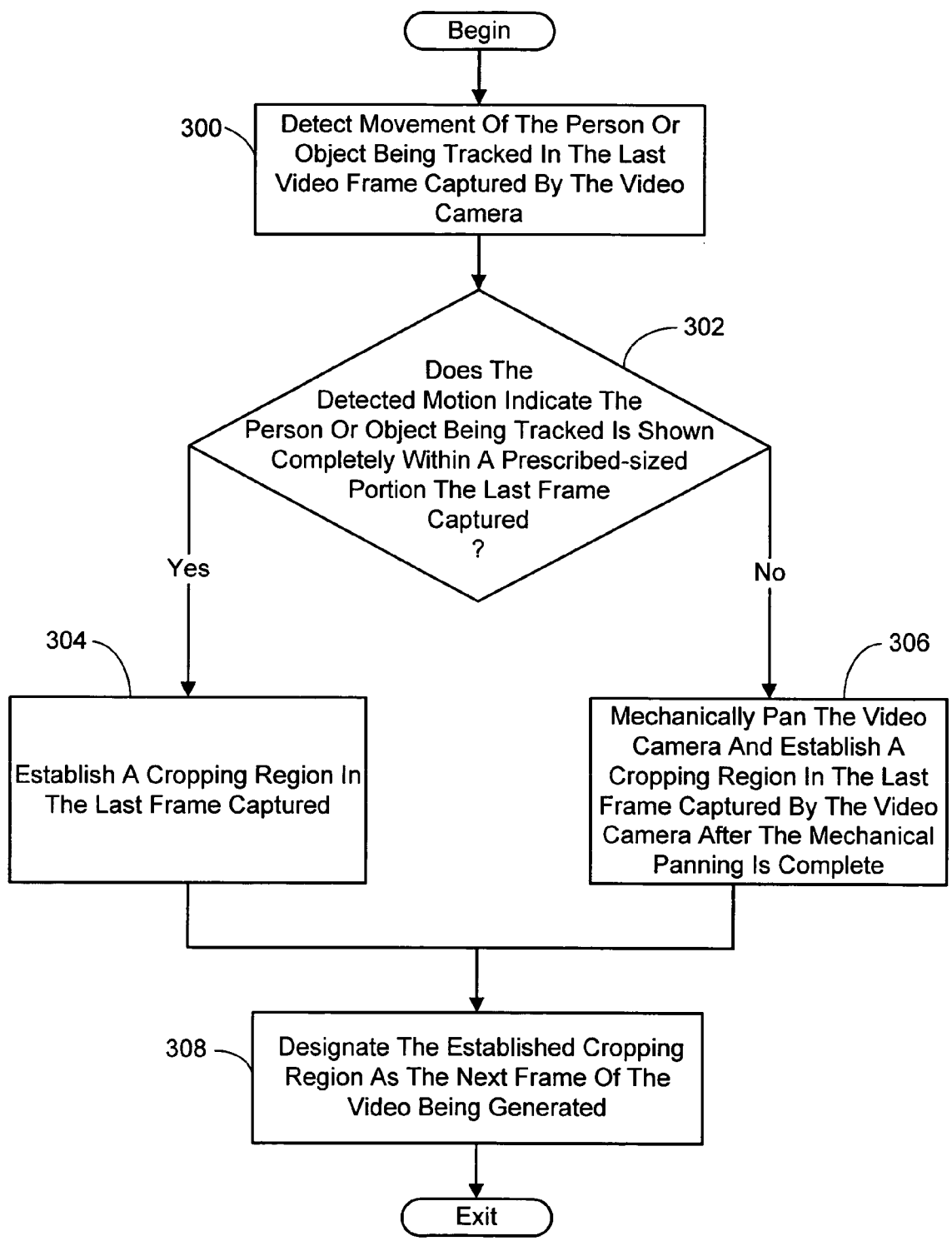
FIG. 3 is a flow chart diagramming an overall process for generating a video from the output of a single digital video camera that tracks a person or object of interest moving in a scene using a combined digital and mechanical tracking technique in accordance with the present invention.

One implementation of this tracking technique is generally outlined in FIG. 3. In essence, this implementation of the tracking system and process involves, on a periodic basis, first detecting movement of the person or object being tracked in the last video frame captured by the video camera (process action 300). It is next determined if the detected motion indicates the person or object being tracked is shown completely within a prescribed-sized portion the last frame captured (process action 302). If it does, then a cropping region, which is a prescribed-sized sub-region of the last frame that shows at least part of the person or object of interest, is established (process action 304). This feature of finding the person or object being tracked within the last-captured frame of the video camera and establishing the cropping region is referred to as digitally tracking the person or object. However, if the detected motion indicates the person or object being tracked is not shown completely within the prescribed-sized portion the last frame captured, then the video camera is mechanically panned, with some possible exceptions, so as to show at least part of the person or object of interest in a cropping region established in the last frame captured by the video camera after the mechanical panning is complete (process action 306). The process of mechanically panning the camera to establish a cropping region containing the person or object of interest is referred to as mechanically tracking the person or object. In either case, the established cropping region is designated as the next frame of the video being generated (process action 308). Thus, at each periodic time instance, another frame of the video is produced, showing the person or object of interest moving through the scene.

The following sections will describe each module of the foregoing system and process in greater detail.

2.1 Motion Detection

Figure 4:
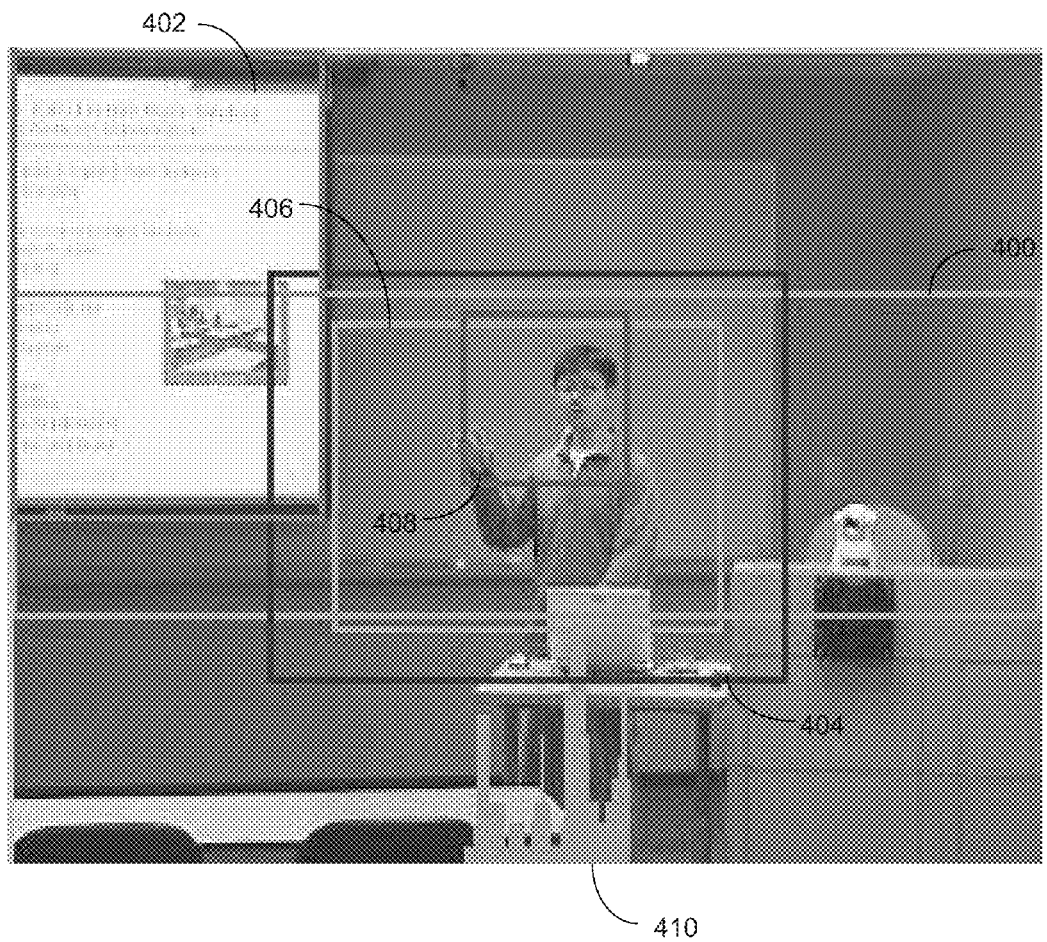
FIG. 4 is an image of a speaker lecturing at the front of a lecture hall with the detection, screen, cropping, safety and motion regions identified.

As illustrated in FIG. 4, several regions are defined for use in the present tracking system and process. The first of these regions is the detection region 400. The detection region 400 represents a horizontal strip across the entire width of the FOV of the camera. In general, its lower and upper vertical boundaries are preset to encompass an area that it is believed any motion associated with the person or object of interest will occur. In the example image shown in FIG. 4, this detection region is set so as to contain a lecturer's upper body when in a standing position. As a lecturer will typically remain standing throughout the lecture, any motion associated with the lecturer would typically occur in the prescribed detection region.

If the scene containing the person or object being tracked also includes a secondary region of interest, the boundaries of this region are also preset. For example, in the context of the lecture example depicted in FIG. 4, the display screen at the front of the lecture room is of interest. As such, the horizontal and vertical boundaries of a "screen" region 402 are prescribed. The boundaries of the detection and screen regions will not typically change during the course of a tracking session. This is why their boundaries can be defined ahead of time. In tested embodiments, the heights of the lower and upper boundaries of each region 400, 402 were manually specified by a user, as were the locations of the lateral boundaries of the screen region 402. Notice that in the context of a lecture, this only needs to be done once for a given lecture room.

The remaining regions will move during the course of the tracking session and so are computed on a periodic basis as the session progresses. These regions include a cropping region 404, a safety region 406 and a motion region 408. The cropping region 404 defines the aforementioned sub-region of each frame of the captured video that is used to generate a frame of the output video. It is generally square or rectangular in shape and has an aspect ratio consistent with the desired format of the output video. For example, the captured video might have a resolution of 640×480, and the cropping region 404 might be a 320×240 sub-region of this view. In tested embodiments, the vertical position of the cropping region 404 is manually specified by a user and fixed. The user specifies a height that is anticipated will encompass the vertical excursions of the person or object being tracked within the vertical extent of the cropping region 404—at least most of the time. It is believed that in most applications that would employ the present system and process, using a fixed vertical height will be satisfactory while reducing the complexity of tracking a person or object of interest considerably.

The safety region 406 is a region contained within the cropping region 404 that is used to determine when a digital panning operation is to be performed as will be described shortly. This safety region 406 is defined as the region having lateral safety boundaries that are a prescribed distance W in from the lateral boundaries of the cropping region 404. The motion region 408 is an area computed based on motion detected in a frame. While the safety and motion regions 406, 408 are shown with top and bottom boundaries in FIG. 4 for ease in identification, these are not important to the present tracking system and process, and so need not be computed or prescribed by the user.

In regard to the motion region 408, it is noted that there have been many automatic detection and tracking techniques proposed that rely on detecting motion. While any of these techniques can be used, a motion histogram-based detection technique was adopted for use in tested embodiments of the present tracking system and process. This technique is simple, sensitive and robust to lighting variations. More particularly, consider a video frame captured at time instance $t_n$, n=0, 1, .... For each frame after the first, a frame difference is performed with the previous frame for those pixels in the prescribed detection region. All the corresponding pixel locations that exhibit an intensity difference above a prescribed threshold are then identified. In tested embodiments, the threshold was set to 15 (out of 256 grayscale levels), though such a threshold could vary for different rooms and their lighting conditions. The identified pixel locations in the current frame are designated as motion pixels. A horizontal motion pixel histogram is then generated. In essence this means using the count of the motion pixels found in each pixel column of the detection region to generate each respective bin of the histogram. The horizontal motion pixel histogram is then used to identify the horizontal segment of the current frame that contains the moving person or object of interest. More particularly, denote the histogram for the video frame captured at time instance $t_n$ as $h_k^{t_n}$, where k=1 ... N and N is the number of bins which equals the number of pixel columns (e.g., 640 in a 640×480 frame). The person or object of interest, such as a speaker or lecturer, is deemed to be located in the "motion" segment $\Pi_m^{t_n}=(a_m^{t_n},b_m^{t_n})$ on the horizontal axis of the video frame captured at time instance $t_n$ that satisfies the equation:

$$\sum_{k \in \Pi_m^{t_n}} h_k^{t_n} = \sum_{k \in \epsilon(\Pi_m^{t_n},\delta)} h_k^{t_n} > .70 \sum_{k=1}^{N} h_k^{t_n}, \quad (1)$$

where $a_m^{t_n}$ is the pixel column along the horizontal axis of the video frame captured at time instance $t_n$ where the motion segment begins, $b_m^{t_n}$ is the pixel column along the horizontal axis of the video frame captured at time instance $t_n$ where the motion segment ends, $\epsilon(\Pi_m^{t_n},\delta)$ is an expansion operator which expands the motion segment $\Pi_m^{t_n}$ to both the left and right by $\delta$. The above equation means that the motion segment is one that contains 70% of the motion pixels. In addition, it is one where no motion pixel will be added if the segment is expanded by $\delta$. In tested embodiments, $\delta$ was set to 5 pixels, although a different value could be employed instead. If no segment fulfills both the above conditions, the motion segment is deemed to be the same as that computed for the previous time period, i.e., $\Pi_m^{t_n}=\Pi_m^{t_{n-1}}$. In the case where the motion detection procedure has just begun and there has been no segment that fulfills both the foregoing conditions as of yet, the motion segment is deemed to be "empty". A graphical representation of an example horizontal motion pixel histogram 410 in the motion segment portion of the horizontal axis is shown superimposed on the image in FIG. 4.

It is noted that the tracking procedure does not begin until the motion detection region has reliably detected the location of the speaker. Once the speaker location is ascertained, an initial motion segment is produced. This initial motion segment is then used to start the tracking procedure.

2.2 Tracking

Given the motion detection results, a smooth output video that follows the person or object of interest can be generated using a combination of digital and mechanical tracking. Generally, with some exceptions, this is done by re-computing the location of the aforementioned cropping region at each time instance so as to keep the person or object of interest approximately centered in the region. As stated previously the cropping region becomes the output frame of the video being generated. To determine the new location of the cropping region at every time instance a tracking process is employed. More particularly, consider at time instance $t_n$, the detection procedure generates a motion segment $\Pi_m^{t_n}$. This motion segmented $\Pi_m^{t_n}$ is used to compute the location of a cropping segment $\Pi_c^{t_n} = (a_c^{t_n}, b_c^{t_n})$ where $a_c^{t_n}$ is the pixel column along the horizontal axis of the video frame captured at time instance $t_n$ where the cropping segment begins and $b_c^{t_n}$ is the pixel column along the horizontal axis of the video frame captured at time instance $t_n$ where the cropping segment ends. The vertical position of the cropping region is fixed and established prior to the tracking process as mentioned previously. Thus, the cropping segment completely defines the location of the cropping region.

The sections to follow will described how the cropping segment location is computed, first in the context of a digital tracking within the FOV of the video camera and then in the context of a mechanical tracking (e.g., mechanically panning the camera) if the person or object being tracked moves outside the FOV of the camera at its current position.

2.2.1 Digital Tracking

Rules collected from professional videographers suggest that a video camera following the movements of a person or object of interest should not move too often—i.e., only when the person or object moves outside a specified zone. This concept is adopted in the present tracking system and process. To this end, the aforementioned safety region is employed. More particularly, given the cropping segment computed at the last previous time instance ($\Pi_c^{t_{n-1}}$), a safety segment is defined as $\Pi_s^{t_{n-1}} = (a_s^{t_{n-1}}, b_s^{t_{n-1}})$, where $a_s^{t_{n-1}} - a_c^{t_{n-1}} = b_c^{t_{n-1}} - b_s^{t_{n-1}} = W$, and where W is the aforementioned prescribed distance in from the lateral boundaries of the cropping region and will be referred to as the safety gap. In tested embodiments, the safety gap was set to a constant value of W=40 pixels, although other values could be employed as well depending on what is being tracked and how fast it typically moves. The safety segment computed for the immediately preceding time instance is used to determine if a digital tracking operation will be performed at the current time instance or if the previous location of the cropping region is to be maintained. More particularly, if the motion segment computed for the current time instance is unknown or it falls completely inside this safety segment (i.e., the motion segment is empty ($\Pi_m^{t_n} = \emptyset$) or is a subset of the safety segment ($\Pi_m^{t_n} \subset \Pi_s^{t_{n-1}}$), the location of the cropping region is left unchanged. Thus, the first rule of the present tracking system and process is:

Rule 1: If $\Pi_m^{t_n} \subset \Pi_s^{t_{n-1}}$, $\Pi_c^{t_{n-1}} = \Pi_c^{t_{n-1}}$.

However, if the motion segment computed for the current time instance is known ($\Pi_m^{t_n} \neq \emptyset$) and does not fall completely inside this safety segment computed for the previous time instance ($\Pi_m^{t_n} \not\subset \Pi_x^{t_{n-1}}$), then two scenarios are considered. First, if $\Pi_m^{t_n}$ and $\Pi_s^{t_{n-1}}$ do not overlap at all ($\Pi_m^{t_n} \cap \Pi_s^{t_{n-1}} = \emptyset$), it is very likely that the person or object being tracked has completely moved outside the safety region. In this case, a digital panning operation to bring the subject back into the safety region is performed as will be described shortly. On the other hand, if $\Pi_m^{t_n}$ and $\Pi_s^{t_{n-1}}$ partially overlap ($\Pi_m^{t_n} \cap \Pi_s^{t_{n-1}} \neq \Pi_m^{t_n}$), this means the person or object being tracked is on one side of the cropping region but not out yet. In this latter case, a digital panning operation is not initiated unless this condition has persisted for more than a prescribed period of time $T_0$. In tested embodiments, $T_0$ was set to 3 seconds, although another period could be employed again depending on what is being tracked and how fast it is moving. By not immediately moving the cropping region when a person or object being tracked is straddling the safety segment boundary, the apparent motion of the camera in the output video is minimized in accordance with the aforementioned videographer rules.

Given the above, the second rule of the present tracking system and process can be characterized as:

Rule 2: If $\Pi_m^{t_n} \cap \Pi_s^{t_{n-1}} = \emptyset$, or $\Pi_m^{t_n} \cap \Pi_s^{t_{n-1}} \neq \Pi_m^{t_n}$ for a period greater than $T_0$, digital panning is performed Whenever a digital panning operation to bring the person or object being tracked back into the safety region is to be performed, it can be accomplished as follows. Without loss of generality, assume there is a need to digitally pan to the right (i.e., move the cropping region to the right within the current FOV of the video camera to bring the person or object being tracked back into the safety region). It is known that the right boundary of the motion segment is farther to the right than the right boundary of the safety segment—otherwise a digital panning operation would not have been initiated. Accordingly, it can be stated that $b_m^{t_n} > b_s^{t_{n-1}}$. Now, let $d_{right}^{t_n} = b_m^{t_n} - b_s^{t_{n-1}}$. If the cropping region is moved to the right by $d^{t_n}$ at time instant $t_n$, the person or object being tracked will be found inside the safety region again. A similar procedure would be followed to digitally pan left, except in this case it is known that $a_s^{t_{n-1}} > a_m^{t_n}$ and so $d_{left}^{t_n} = a_s^{t_{n-1}} - a_m^{t_n}$.

Unfortunately, the foregoing scheme could make it appear that the camera view has "hopped", instead of moving smoothly. Thus, while this method of digital tracking could be employed, a more elegant solution is possible. By observing professional videographers, it has been found that they can pan the camera very smoothly, even though the person or object being tracked may make a sudden motion. They do not pan the camera at a very fast speed, which implies that the panning speed should be limited. In addition, human operators cannot change their panning speed instantaneously. This could be mimicked by employing a constant acceleration. To this end, movement of the cropping region during a digital panning operation could alternately be computed by applying a unique constant acceleration, limited speed (CALS) model. More particularly, let the moving speed of the cropping region at time instance $t_n$ be $v^{t_n} (v^{t_n} \geq 0)$. The moving speed can be computed as:

$$v^{t_n} = \min(v^{t_{n-1}} + \alpha s^{t_n}(t_n - t_{n-1}), v_{max}). \qquad (2)$$

where $s^{t_n}$ is the sign of $d^{t_n}$, $\alpha$ is a prescribed constant acceleration (e.g., 150 pixels per square second) and $v_{max}$ is a prescribed maximum panning speed (e.g., 80 pixels per second).

Given the moving speed at the time instance $t_n$, the cropping segment at $t_n$ can be computed as:

$$\Pi_c^{t_n} = S(\Pi_c^{t_{n-1}}, v^{t_n}(t_n - t_{n-1})), \qquad (3)$$

where $S(\Pi, x)$ is a shift operator that shifts the last previously computed cropping segment $\Pi_c^{t_{n-1}}$ horizontally by the shifting distance x to the right or left depending on if $d_{right}^{t_n}$ or $d_{left}^{t_n}$ was used.

The computed cropping segment location is then used along with the prescribed vertical height of the cropping region to determine the location of the cropping region within the overall captured frame associated with the current time instance $t_n$.

It is noted that in the case of the first time instance at the beginning of the tracking procedure, the aforementioned initial motion segment is used to define a cropping segment location that acts as the "previous" cropping segment location for the above computations. In one embodiment, the location of this initial cropping segment is established as the prescribed width of the segment centered laterally on the center of the initial motion segment.

2.2.2 Mechanical Tracking

The digital tracking procedure described above can track the person or object being tracked inside the FOV of the camera. However, the person or object of interest may move out of the FOV of the camera at its current position. In such cases, the video camera needs to be mechanically panned to follow the person or object. Notice that before the person or object being tracked moves out of the FOV of the camera, the motion detection procedure should report a motion segment located around the boundary of a captured video frame. Given this, the decision to initiate a mechanical tracking operation can be made very simple. Generally, if any part of the current motion segment comes within a prescribed distance of the boundary of the current captured video frame on either side, a mechanical panning operation may be initiated.

During the mechanical panning operation, the motion detection procedure described previously cannot detect the person or object being tracked with any reliability. Therefore, the last computed location of the cropping region remains fixed until the mechanical panning has stopped. The amount of mechanical panning relies on the camera zoom level. In essence, the goal is to pan the camera in the direction of the person or object being tracked just enough so as to center the person or object within the temporarily fixed location of the cropping region. For example, assume the width of the person or object being tracked at the current zoom setting of the video camera is approximately 120 pixels. Thus, before the mechanical panning begins, the center of the speaker is about 60 pixels inward from one of the boundaries of the capture frame under consideration. In addition, assuming the cropping region is 320 pixels wide and the captured frame is 640 pixels wide, the width of the cropping region extend either from 0 to 320 or from 320 to 640. With these parameters, if the camera is mechanically panned 100 pixels in a direction that will bring the center of the next captured frame closer to the person or object being tracked, that person or object will be approximately in the middle of the cropping region, assuming the location of the cropping region is not changed in relation to the overall frame from its location in the last previous time instance and the person or object being tracked remains static. Thus, each mechanical panning operation initiated at the aforementioned zoom level would entail panning the camera in the appropriate direction by 100 pixels. The panning distance can be readily calculated for other zoom levels either on the fly or ahead of time. A quick way to make the panning distance calculation is to subtract the width of the person or object being tracked at the current zoom level ($w_z$) from the width of the cropping region ($w_c$) and then dividing by two (i.e., $(w_c-w_z)/2$).

It is also noted that continuous mechanical panning can be distracting to the viewer. As such, in one embodiment of the present tracking system and process, two sequential mechanical panning motions have to be separated by a prescribed time interval. For example, in tested embodiments, the time interval was set to 3 seconds, although a shorter or longer time period could be employed. When a mechanical panning is called for, but precluded due to the prescribed time interval test, at each time instance prior to reaching the prescribed time interval, a frame of the video being generated is created using the cropping region location associated with the last previous time instance.

In view of the foregoing, the third rule of the present tracking system and process associated with mechanical panning could be characterized as:

Rule 3: Mechanical panning of the video camera is initiated if $\Pi_m^{t_n} \cap [(A,\epsilon) \cup (B-\epsilon,B)] \neq \emptyset$ and no previous mechanical panning operation has been perform in the time period $T_{mp}$, where $\epsilon$ is a small value corresponding to the aforementioned prescribed distance to the boundary of the captured video frame, A refers to the boundary of the frame on the left side, B refers to the boundary of the frame on the right side and $T_{mp}$ is the aforementioned prescribed minimum time interval between mechanical panning operations. It is noted that in tested embodiments of the present tracking system and process, $\epsilon$ was measured in pixel columns and set to 2 columns. Thus, in this example, if the edge of the motion segment comes within 2 pixel columns of the captured frame boundary on either side at time instance $t_n$, a mechanical panning operation maybe initiated.

2.2.3 The Combined Digital and Mechanical Tracking Process Flow

The following is a description of one embodiment of a process flow for performing the combined digital and mechanical panning operation described above. Referring to FIGS. 5A-E, the process begins by defining the detection region based on user input (process action 500). In addition, a secondary region of interest can be optionally defined at this point, again based on user input (optional process action 502). The purpose for this designation will be described in the next section. The vertical height of the cropping region is established as specified by the user (process action 504). Once all the preliminary matters are complete, the tracking process proceeds by determining if the first time instance has been reached (process action 506). If not, the action 506 is repeated. When it is determined the first time instance has been reached, the location of the motion segment is computed (process action 508). As indicated earlier, in one embodiment of the present tracking process, computing the motion segment for the current time instance involves computing the segment using a motion histogram-based detection technique. If a segment is found, it is designated as the motion segment for the current time instance. However, if no motion segment can be found, then either the last previously computed motion segment is designated as the current motion segment, or if no previous segment exists, the motion segment is designated as being "empty". Once the motion segment has been established, it is determined if any part of the current motion segment comes within a prescribed distance of the boundary of the current captured video frame on either side (process action 510). If not, in process action 512, the location of the safety segment is computed based on the cropping region for the last previous time instance (or in the case of the first time instance based on the initial motion segment location). The location of the cropping region for the current time instance is then computed. More particularly, it is first determined if the current motion segment is empty (process action 514). If it is not, then it is determined if the motion segment is completely within the extent of the last computed safety segment (process action 516). If the motion segment is contained within the safety segment, or if it was determined that the motion segment is empty, then in process action 518 the location of the current cropping segment is set equal to the location of the last previously computed cropping segment (or in the case of the first time instance based on the initial motion segment location). However, if in process action 516 it is determined that the motion segment is not completely within the extent of the last computed safety segment, then it is determined if the motion segment is completely outside of the last computed safety segment or if it is partially overlapping the extent of the safety segment (process action 520). In the case where it is overlapping, it is determined if the period of time that the overlap condition has existed exceeds the prescribed period $T_0$ (process action 522). If not, then the location of a current cropping segment is set to the location of the last previously computed cropping segment or in the case of the first time instance, to the location of a cropping segment based on the initial motion segment location (process action 524). If, however, it is determined in process action 520 that the motion segment is completely outside of the last computed safety segment, or if it is determined in process action 522 that the period of time that the overlap condition has existed does exceed the prescribed period $T_0$, the side (i.e., right or left) of the last computed safety segment that the current motion segment is adjacent to or straddling, is identified (process action 526). Next, the distance between the corresponding side of the motion segment (i.e., right or left) and the identified side of the safety segment is computed (process action 528). It is noted that in one embodiment of the present tracking process, the current cropping segment location can be computed as the last previous location of the cropping segment shifted in the direction (i.e., right or left) of the identified side of the safety segment by the distance computed in process action 528. Alternately, the previously-described CALS technique can be employed to produce a smoother result. The process flow outlined in FIG. 5D will reflect this later procedure, although it is not intended that the tracking process be limited to this alternative. In the CALS technique, the next process action 530 is to compute the moving speed of the cropping region at the current time instance. As indicated previously, the moving speed will be the lesser of the prescribed maximum velocity, or the velocity computed for the last time instance, increased by the product of the prescribed acceleration and the difference in time between the current and last time instances and given the sign (i.e., + or −) of the distance computed in process action 528. The current cropping segment location is then computed as the last previous location of the cropping segment shifted in the direction (i.e., right or left) of the identified side of the safety segment by a shifting distance (process action 532). As described previously, the shifting distance is computed as the moving speed of the cropping region at the current time instance multiplied by the difference in time between the current and last time instances. No matter how the current cropping segment is established (see process actions 518, 524 and 532), the next process action 534 is to establish the location of the current cropping region using the just computed cropping segment and the prescribed vertical height of the region. However, if in process action 510 it was determined that some part of the current motion segment falls within the prescribed distance of one of the side boundaries of the last captured video frame, it is determined if a mechanical panning operation has been performed within the prescribed minimum time interval (process action 536). If it has, then no mechanical panning is performed and at each time instance prior to the expiration of a prescribed time interval, a frame of the video being generated is created using the cropping region location associated with the last previous time instance (process action 538). However, if no mechanical panning operation has occurred within the prescribed minimum time interval, then the mechanical panning distance is computed for the current camera zoom level (process action 540). This is followed in process action 542 by mechanically panning the video camera over the computed mechanical panning distance in the direction that will bring the center of the next video frame to be captured closer to the person of object being tracked. The location of the current cropping region is then established as that computed for the last previous time instance (process action 544). It is then determined if the next time instance has been reached (process action 546). If not, process action 546 is repeated. Once the next time instance is reached, it is determined if the video session is ongoing (process action 548). If so process actions 508 through 548 are repeated, as appropriate. Otherwise the process ends.

2.3 Intelligent Pan/Zoom Selection

Mixing digital and mechanical tracking by applying Rules 1-3 together can provide very satisfactory results. However, there are additional aesthetic aspects that can be included in the present tracking system and process that go beyond just following the person or object of interest. Namely, the aforementioned secondary area of interest can be handled differently and the camera zoom level can be automated. Both of these features would further enhance the viewability of the video produced.

2.3.1 Secondary Area of Interest

As indicated previously, there may be an area in a scene being videotaped that is of interest to the viewer aside from the person or object being tracked. In some cases, it is desired to present this area in a special way when it is shown in the output video. For example, professional videographers suggest that if a speaker walks in front of a presentation screen, or if there are animations displayed on the screen, the camera should be pointed toward that screen. Traditionally this is handled using a dedicated video camera that captures images of just the screen. The output of this separated camera is employed in the video produced at the appropriate times. A similar scheme is followed for any secondary area of interest. However, it is possible to mimic the function of this separate, dedicated camera using the same camera that tracks the person or object of interest as described above.

To accomplish the foregoing task, the previously described tracking system and process needs to be modified somewhat. More particularly, the area of interest should be kept inside the FOV of the camera as much as possible, without eliminating the person or object being tracked from the view. This allows the secondary area of interest to be cropped from the overall frame and used as desired in the video being produced. To fulfill the above requirement, it will sometimes be necessary to mechanically pan the video camera toward the secondary area of interest to keep it in view, even though the previously described tracking procedure may dictate that a digital panning operation be performed to track the person or object of interest. This is because a digital panning operation would not bring more of the secondary area of interest into the overall captured frame, whereas a mechanical panning operation toward that area would result in more of it being captured. In view of this, the modified procedure entails giving priority to performing a mechanical tracking operation whenever the following three conditions are satisfied. First, the secondary area of interest is not fully inside the FOV of the camera. Second, there is a need to perform digital panning towards where the secondary area of interest is due to motion of the person or object being tracked. And third, performing a mechanical tracking operation as described previously will not result in the person or object being tracked being eliminated from the FOV of the camera at its new position. In such scenarios, the digital panning operation is overridden in favor of a mechanical panning operation.

In view of the foregoing, an optional fourth rule of the present tracking system and process could be characterized as:

Rule 4: A mechanical panning of the camera is commenced if,
a) $\Pi_{sa}^{t_n} \cap (A,B) \neq \Pi_{sa}^{t_n}$ where $\Pi_{sa}^{t_n}$ is the location of a horizontal segment at time instance $t_n$ corresponding to the lateral extent of the secondary area of interest;
b) A digital panning towards the secondary area of interest is needed in accordance with the aforementioned Rule 2; and
c) $\Pi_m^{t_n} \subset (\eta,B)$ if panning to the right, or $\Pi_m^{t_n} \subset (A,B-\eta)$ if panning to the left, where $\eta$ is a prescribed number of pixels in the horizontal direction. In tested embodiments $\eta=160$, but could be another value. For example, $\eta$ could be based on the zoom level of the camera.

Figure 5A:
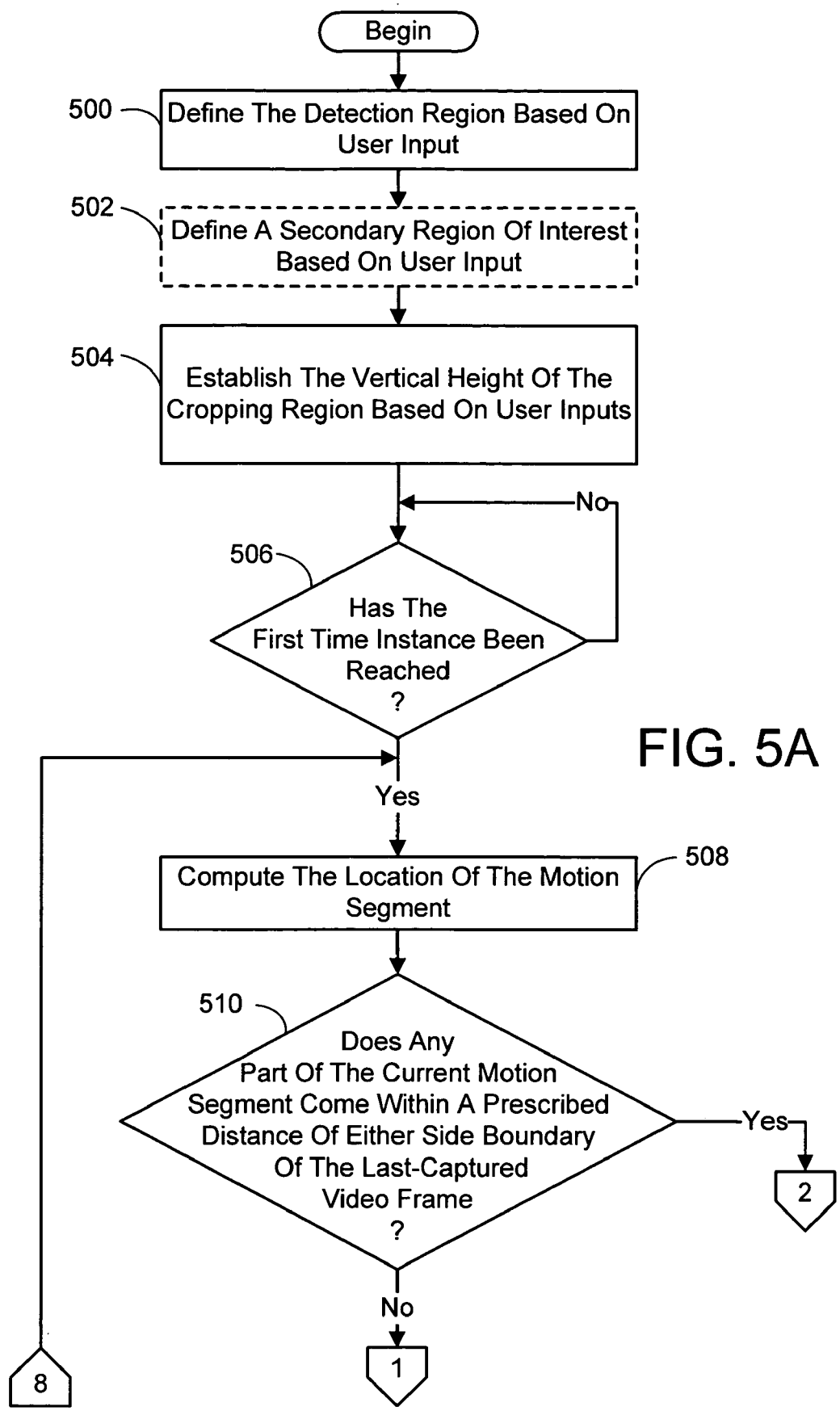
FIGS. 5A-E are a continuing flow chart diagramming a process for establishing the location of a cropping region in frames captured by the video camera as part of the overall tracking process of FIG. 3.
Figure 5B:
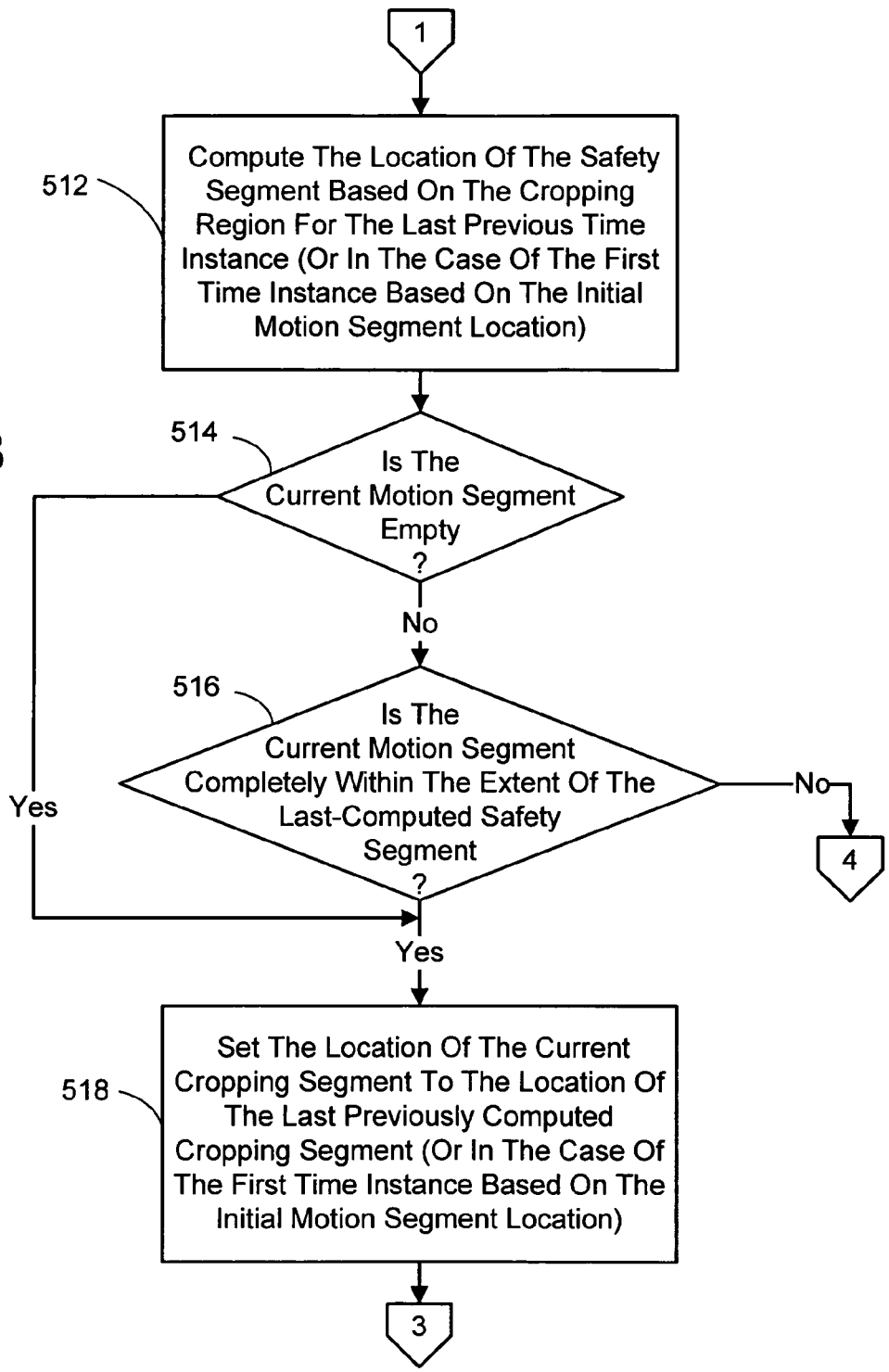
Figure 5C:
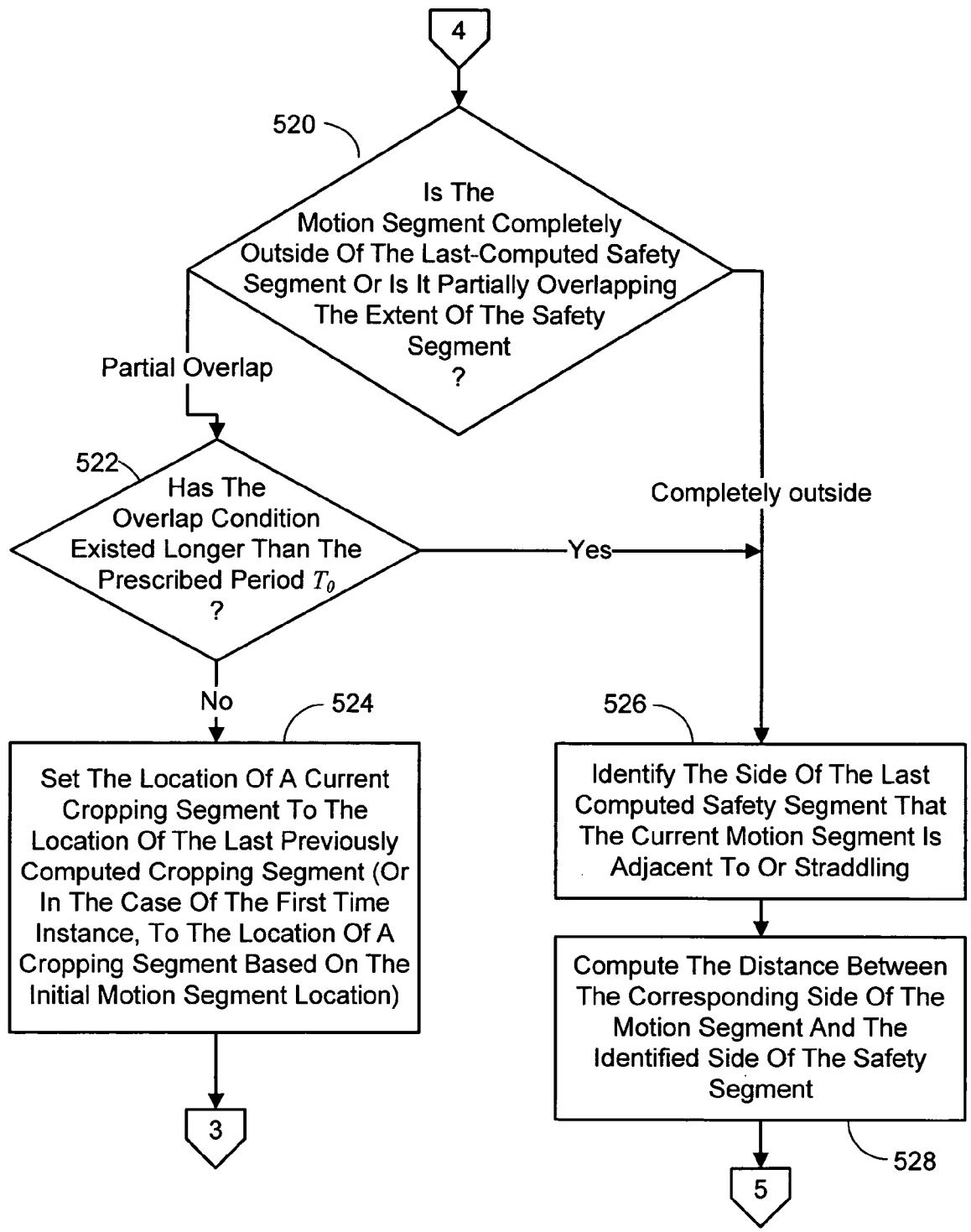
Figure 5D:
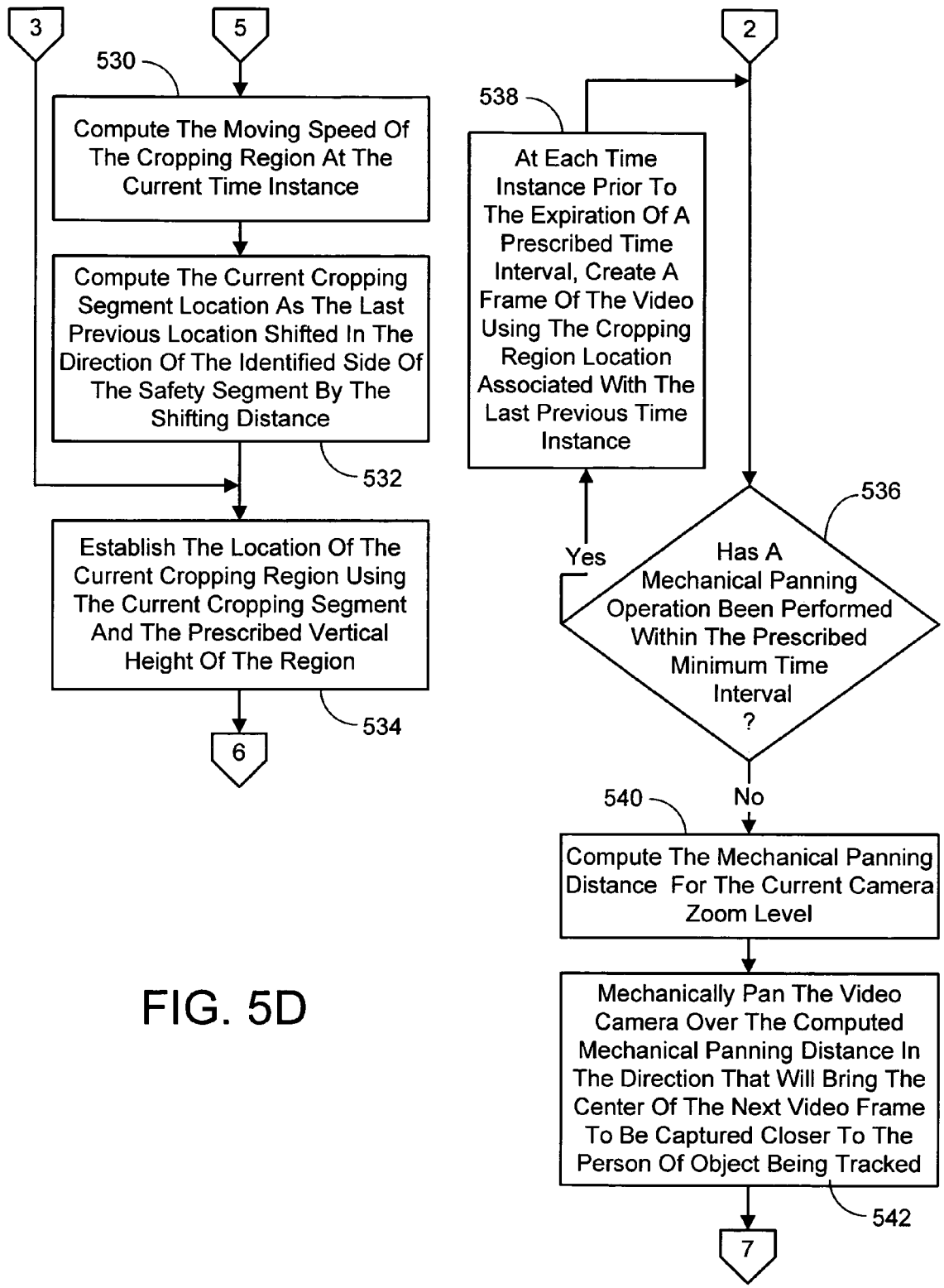
Figure 5E:
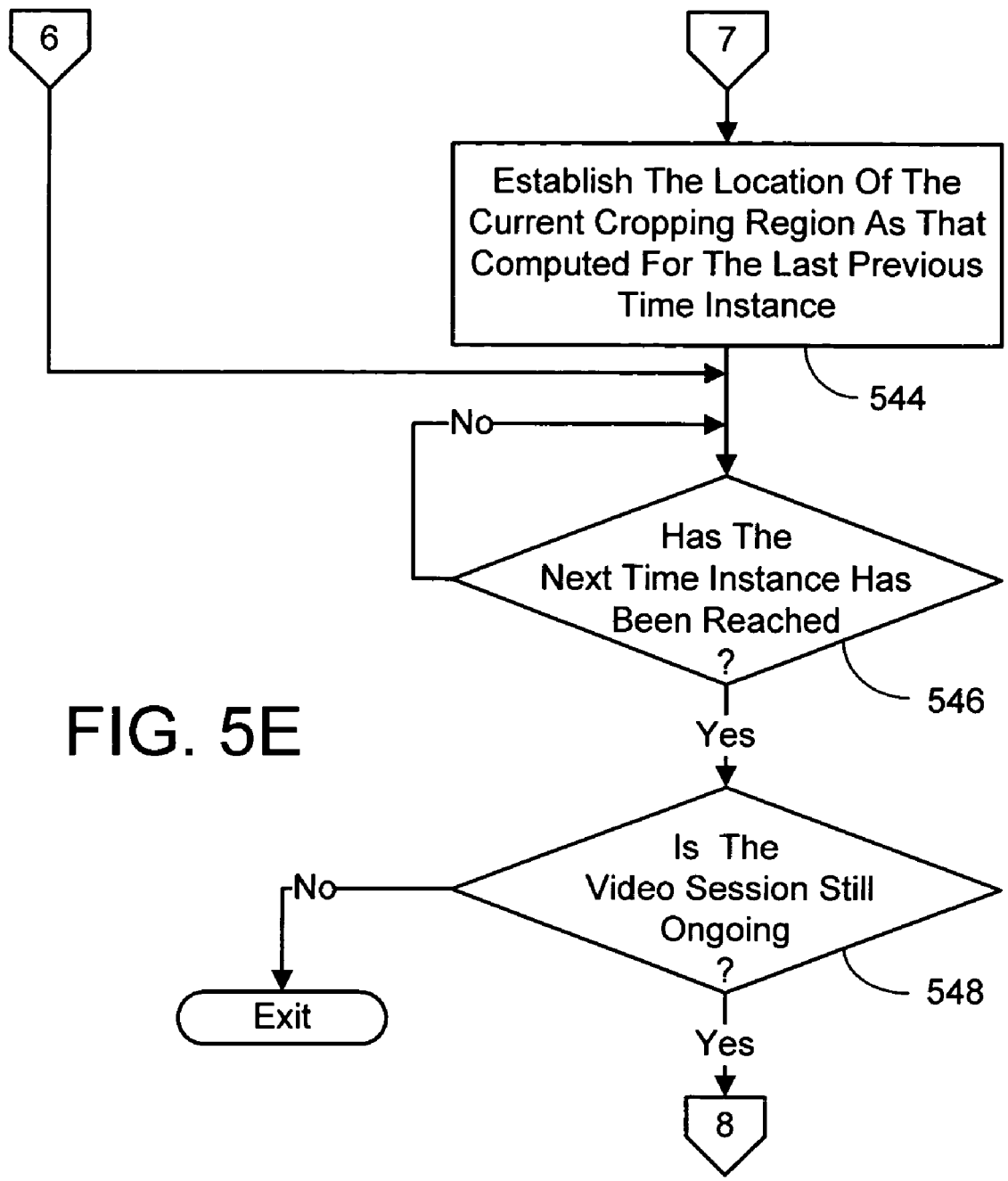
Figure 6:
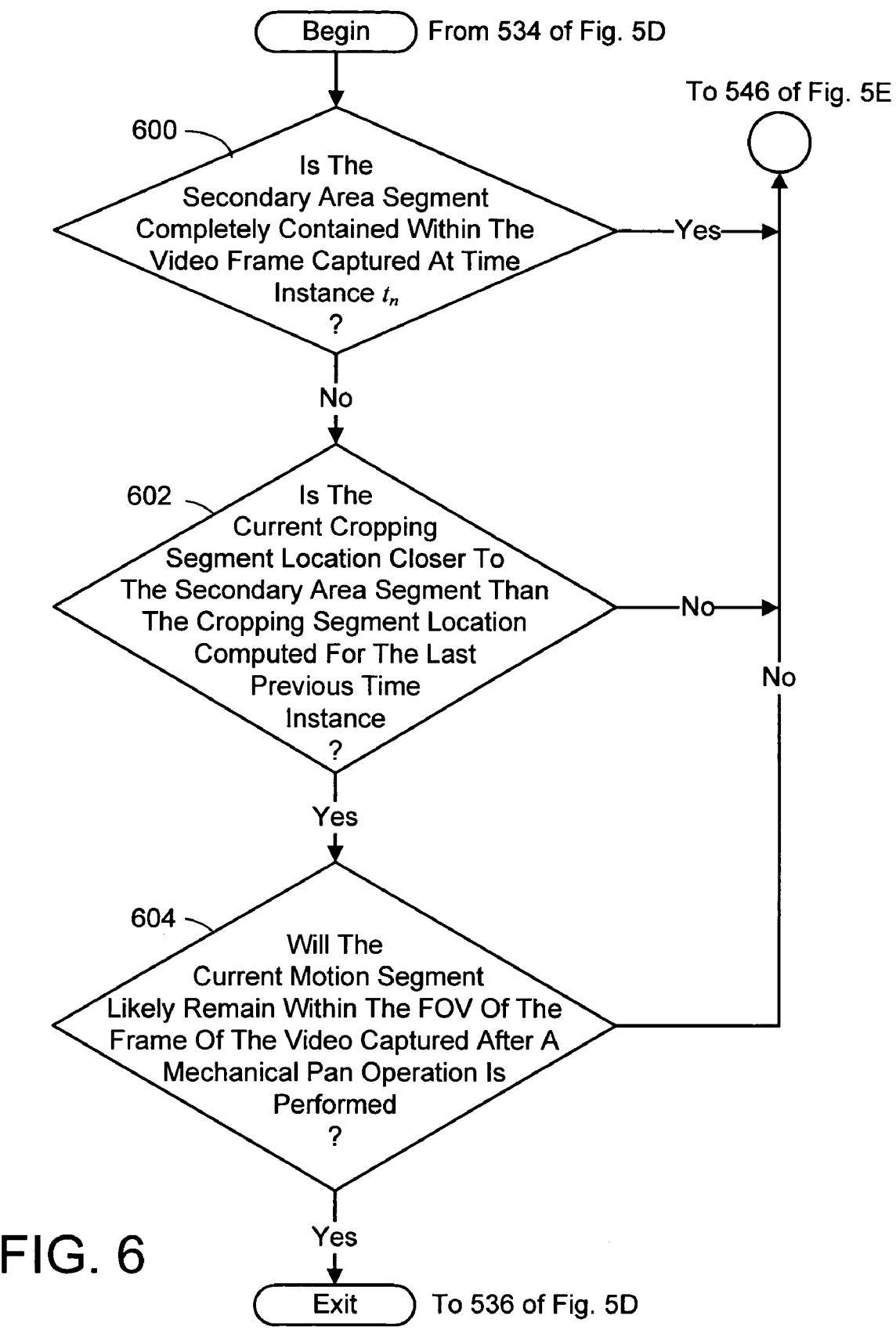
FIG. 6 is a flow chart diagramming a process for implementing an optional secondary area of interest feature in the overall tracking process of FIG. 3.

The following process flow description adds an embodiment of the foregoing secondary area of interest feature to the overall tracking process outlined in FIG. 5A-E. Only those process action associated with this feature will be discussed. Referring to FIG. 6, the process begins after process action 534 of FIG. 5D is completed, and entails determining if the secondary area segment is completely contained within the video frame captured at time instance $t_n$ (process action 600). If it is, then the process of FIG. 5E continues starting with process action 546. If, however all or part of the secondary area segment is found to be outside the video frame captured at time instance $t_n$, then it is determined if the just computed current cropping segment location is closer to the secondary area segment than the cropping segment location computed for the last previous time instance (process action 602). If not, then the process of FIG. 5E continues starting with process action 546. However, if it is closer, then it is next determined if the current motion segment will likely remain within the FOV of the frame of the video captured after a mechanical pan operation is performed (process action 604). If it will, then the process of FIG. 5D continues starting with process action 536 eventually resulting in a mechanical panning operation. If not, then the process of FIG. 5E continues starting with process action 546 and no mechanical panning operation is commenced.

2.4 Automatic Zoom Level Control

A person or object being tracked will behave differently depending on the circumstances. For example, one lecturer will often behave very differently from another lecturer when giving a lecture. Some lecturers stand in front of their laptops and hardly move; others actively move around, pointing to the slides, writing on a whiteboard, switching their slides in front of their laptop, etc. For the former type of lecturers, it is desirable to zoom in more, so that viewer can clearly see the lecturer's gestures and expressions. In contrast, for the latter type of lecturers, it is not desirable to zoom in too much because that will require the video camera to pan around too much during the tracking operation. With this in mind, it is possible to include an optional automatic zoom level control feature in the present tracking system and process that will handle the different types of movement likely to be encountered when tracking a person or object. This feature is based on the level of activity associated with the person or object being tracked. However, unlike the tracking portion of the present system and process, it would be distracting to a viewer if the zoom level of the camera could be changed at every time instance. It is better to only do it once in a while.

More particularly, let the period between zoom adjustments be zoom period $T_1$. The total distance that the person or object being tracked moved over a period $T_1$ is computed. One way of accomplishing this task is to sum the number of pixels in the horizontal direction that the cropping region moved over the zoom period $T_1$. Recall at time instance $t_n$, the movement is $v^{t_n}(t_n-t_{n-1})$ for digital panning. In view of this let:

$$u = \Sigma_{t_n \in T_1} v^{t_n}(t_n-t_{n-1}) + M \times u_0,$$

where M is the number of mechanical pannings in period $T_1$ and $u_0$ is the number of pixels moved during each mechanical panning. Note that $u_0$ will depend on the zoom level used during period $T_1$ and is determined as described previously.

At the end of each time period $T_1$, the zoom level of the video camera is adjusted by the following rule:

Rule 5: At the end of each time period $T_1$, change the zoom level according to:

$$z_{new} = \begin{cases} \max(z_{old} - \Delta z, z_{min}) & \text{if } u > U_1 \\ \min(z_{old} + \Delta z, z_{max}) & \text{if } u < U_2 \\ z_{old} & \text{otherwise} \end{cases}$$

Here $z_{new}$ is the new zoom level and $z_{old}$ is the old zoom level. $\Delta z$ is the step size of zoom level change. $z_{max}$ and $z_{min}$ are maximum and minimum zoom levels. $U_1 > U_2$ are activity thresholds. In tested embodiments, the time period $T_1$ was set to 2 minutes. The $\Delta z$, $z_{max}$, $z_{min}$, $U_1$ and $U_2$ values are set based on the camera involved and the amount of motion anticipated. As a default, the smallest zoom level $z_{min}$ can be used as the initial zoom setting. It was found that the zoom level would stabilize within 5-10 minutes in a lecture environment. It is noted that the foregoing parameter values were tailored to a lecture environment. In other environments, these values would be modified to match the anticipated movement characteristics of the person or object being tracked.

Figure 7:
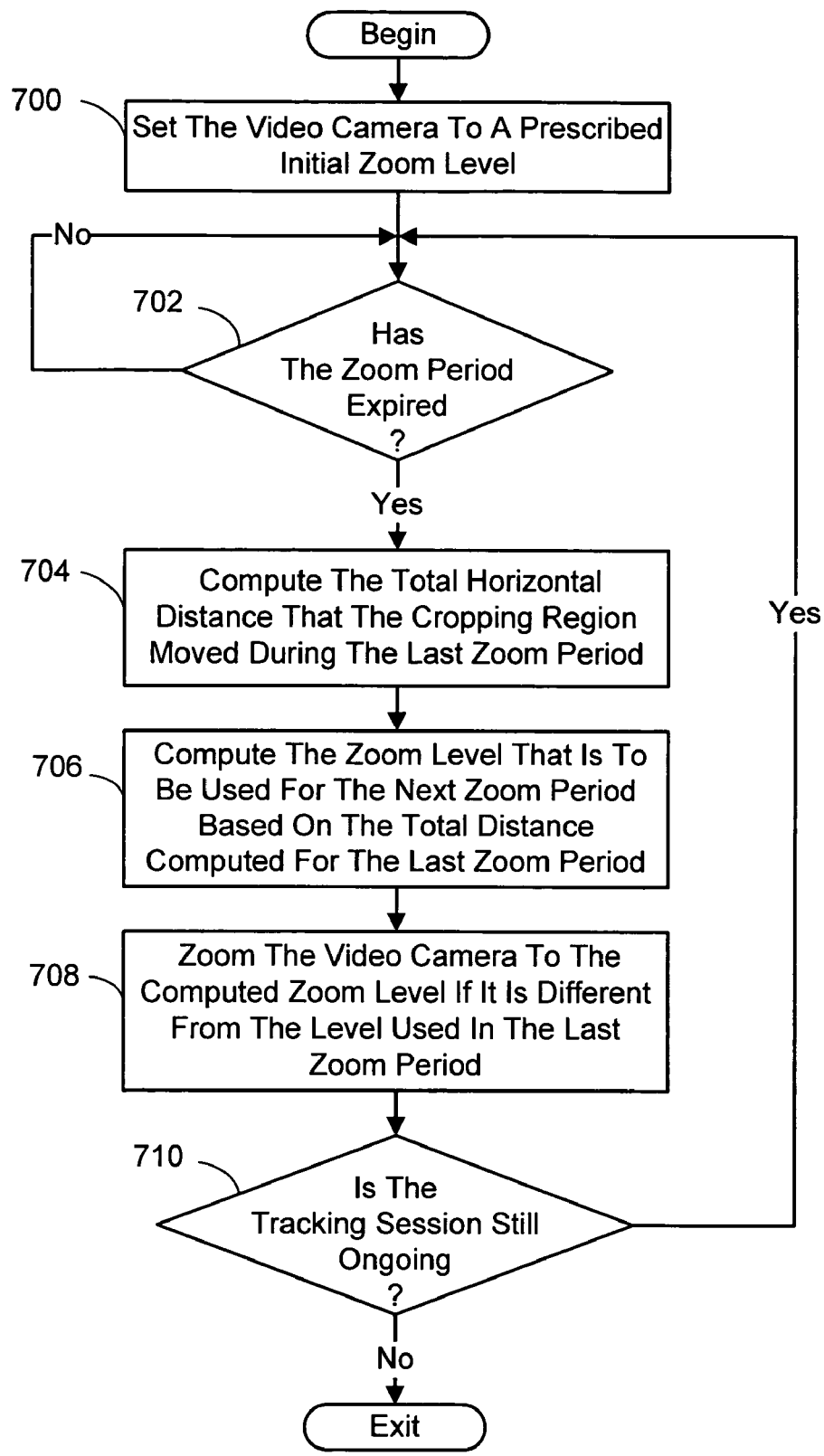
FIG. 7 is a flow chart diagramming a process for implementing an optional automatic zoom level control feature in accordance with the present invention.

Given the foregoing, one embodiment of the automatic zoom level control feature according to the present system and process can be implemented as described in following process flow. Referring to FIG. 7, the process starts by setting the video camera to a prescribed initial zoom level at the beginning of a tracking session (process action 700). It is next determined if a zoom period has expired (process action 702). If not, no action is taken. However, when the period expires, the total horizontal distance that the cropping region moved during the last zoom period is computed (process action 704). The zoom level that is to be used for the next zoom period is then computed based on the total distance computed for the last zoom period (process action 706). The video camera is then zoomed to the computed zoom level if it is different from the level used in the last zoom period (process action 708). Next, it is determined if the tracking session is still ongoing (process action 710). If so, process actions 702 through 710 are repeated. Otherwise, the process ends.

Figure 8:
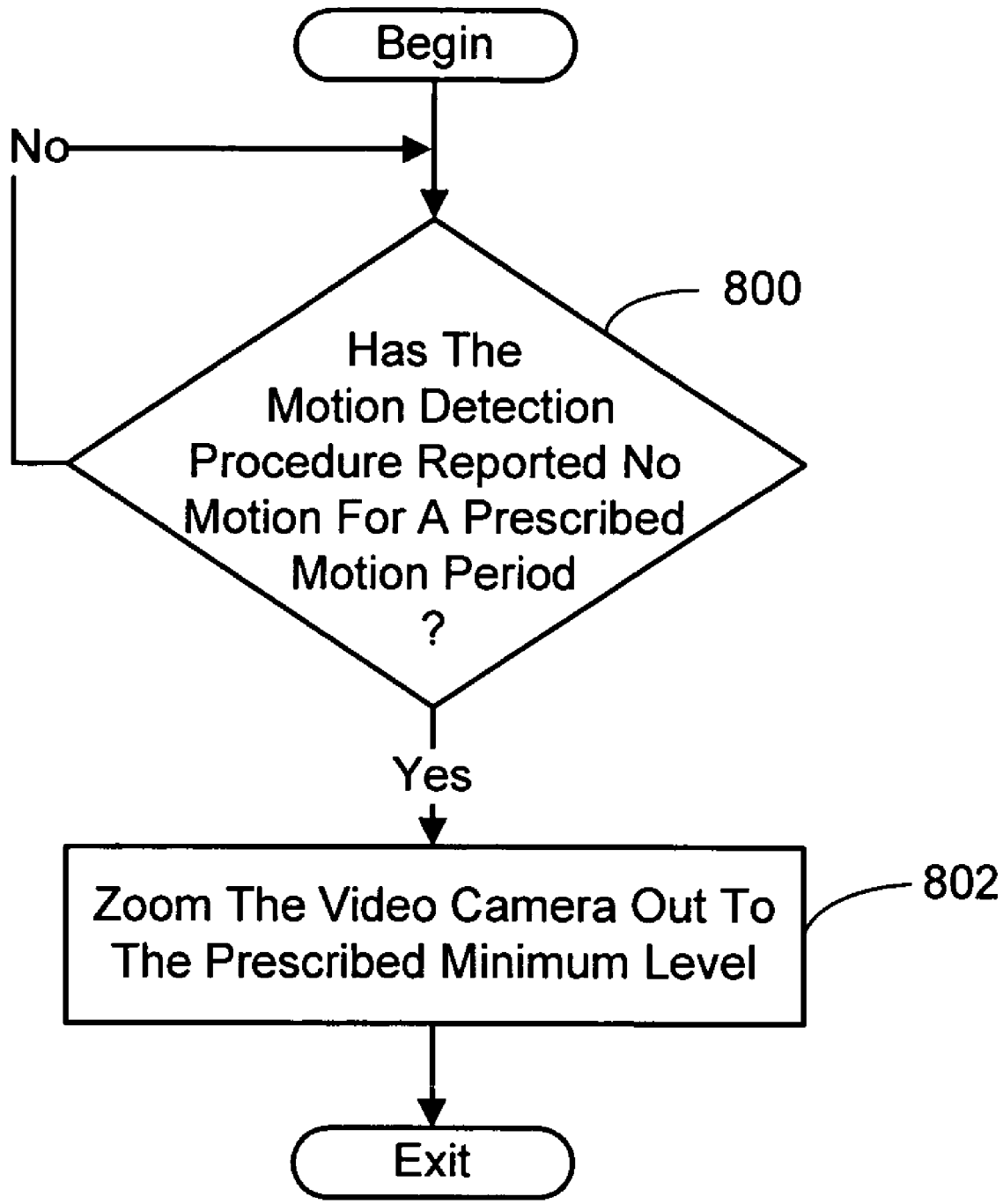
FIG. 8 is a flow chart diagramming a process for re-acquiring a person or object being tracked in accordance with the present invention.

In addition to automatically controlling the zoom level periodically based on the movement of the person or object being tracked, the automatic zoom level control feature can include a provision for re-acquiring the trackee should the motion detection procedure fail. Referring to FIG. 8, it is determined if the motion detection procedure reports no motion for a prescribed motion period (process action 800). In tested embodiments, the motion period was set to 5 seconds. However, depending on the nature of the anticipated movement of the person or object being tracked, another period may be more appropriate. If it is determined that no motion has been detected for the prescribed period, then the video camera is zoomed out to its aforementioned minimum level (process action 802) and the process ends. By zooming the camera out, the motion detection procedure then has a better chance of re-detecting the person or object being tracked because of the larger field of view.

Although the subject matter has been described in language specific to structural features and/or methodological acts, it is understood that the subject matter defined in the appended claims is not necessarily limited to the specific features or acts described above. Rather, the specific features and acts described above are disclosed as example forms of implementing the claims.

Wherefore, what is claimed is:

1. A computer-implemented process for generating a video using a single digital video camera that tracks a person or object of interest moving in a scene, comprising using a computer to perform the following process actions:
    on a periodic basis,
        tracking the movement of a person or object of interest in a scene,
        determining if the movement of the person or object being tracked has been detected within a prescribed period of time,
        whenever the movement has not been detected within the prescribed period of time, zooming the video camera out to a prescribed minimum level so as to maximize the field of view,
        whenever the movement has been detected within the prescribed period of time,
            digitally tracking the person or object of interest within the last frame captured by the video camera by identifying a cropping region defined as a prescribed-sized sub-region of the last frame captured by the video camera that shows at least part of the person or object of interest whenever the detected motion indicates the person or object being tracked is shown completely within a prescribed-sized portion of the last frame captured by the video camera, and
            mechanically tracking the person or object of interest by mechanically panning the video camera in some circumstances where the detected motion indicates the person or object being tracked is not shown completely within the prescribed-sized portion of the last frame captured by the video camera so as to show at least part of the person or object of interest in an identified cropping region of the last frame captured by the video camera after the mechanical panning is complete; and
    generating a video that shows the person or object of interest as that person or object moves through the scene by making each consecutive one of said identified cropping regions a consecutive frame of the video.

2. The process of claim 1, wherein detecting movement of the person or object being tracked comprises an action of establishing the location in the last frame captured by the video camera of a motion segment representing the approximate lateral extent of the person or object being tracked.

3. The process of claim 2, wherein the process action of establishing the location of the motion segment in the last frame captured by the video camera, comprises the actions of:
    searching for a motion segment using a motion histogram-based detection technique;
    whenever a segment is found, designating it as the motion segment for a current time instance; and
    whenever no motion segment can be found,
        designating the last previously computed motion segment as the motion segment for the current time instance if such a previously computed motion segment exists, and
        designating the motion segment for the current time instance to be empty if no previously computed motion segment exists.

4. The process of claim 3, wherein the process action of digitally tracking the person or object of interest within the last frame captured by the video camera, comprises the actions of:
    (a) determining if any part of the motion segment for the current time instance comes within a prescribed distance of either one of the lateral side boundaries of the last frame captured by the video camera;
    (b) whenever the motion segment for the current time instance does not come within the prescribed distance of either one of the lateral side boundaries of the last frame captured by the video camera, computing a location of a safety segment, said safety segment being a lateral segment contained completely within and set-off from the lateral side boundaries of the cropping region computed for the last previous time instance or in the case of the first time instance, lateral boundaries based on an initial motion segment;
    (c) determining if the motion segment for the current time instance is contained completely within the extent of the safety segment;
    (d) whenever the motion segment for the current time instance is contained completely within the extent of the safety segment, or is empty, setting the location of a current cropping segment defined as a lateral segment extending between the lateral side boundaries of a cropping region, to the location of the last previously computed cropping segment or in the case of the first time instance, to a location based on the initial motion segment;
    (e) whenever the motion segment for the current time instance is not contained completely within the extent of the safety segment, determining if the motion segment is completely outside of the safety segment or if it is partially overlapping the extent of the safety segment;
    (f) whenever the motion segment for the current time instance is partially overlapping the extent of the safety segment, determining if the period of time that the overlap condition has existed exceeds a prescribed overlap period;
    (g) whenever the period of time that the overlap condition has existed does not exceed the prescribed overlap period, setting the location of a current cropping segment to the location of the last previously computed cropping segment or in the case of the first time instance, to a location based on the initial motion segment, and waiting for the next time instance, and when the next time instance is reached, repeating process action (a) through (f);
    (h) whenever the motion segment for the current time instance is completely outside of the safety segment, or the period of time that the overlap condition has existed does exceed the prescribed overlap period, identifying the side of the safety segment that the current motion segment is adjacent to or straddling, and computing the separation distance between the corresponding side of the motion segment and the identified side of the safety segment;
    (i) computing the current cropping segment location as the location of the last previously computed cropping segment, or in the case of the first time instance, a location of a cropping segment based on the initial motion segment, shifted in the direction of the identified side of the safety segment based on said separation distance; and (j) establishing the location of the cropping region using the current cropping segment and a user-prescribed vertical height of the region.

5. The process of claim 4, wherein said safety segment is defined as the lateral segment contained completely within the lateral side boundaries of the cropping region computed for the last previous time instance or in the case of the first time instance, lateral boundaries based on the initial motion segment, but set-in from the lateral side boundaries by a prescribed safety gap.

6. The process of claim 4, wherein the process action of computing the current cropping segment location as the location of the last previously computed cropping segment, or in the case of the first time instance, the location of a cropping segment based on the initial motion segment, shifted in the direction of the identified side of the safety segment based on said separation distance, comprises an action of shifting the previous cropping segment by said separation distance.

7. The process of claim 4, wherein the process action of computing the current cropping segment location as the location of the last previously computed cropping segment, or in the case of the first time instance, the location of a cropping segment based on the initial motion segment, shifted in the direction of the identified side of the safety segment based on said separation distance, comprises the actions of:

computing a moving speed of the cropping region at the current time instance as the lesser of a prescribed maximum velocity, or the velocity computed for the last time instance, increased by the product of a prescribed acceleration and the difference in time between the current and last time instances and given a positive or negative sign to match that of the separation distance; and shifting the previous cropping segment by a shifting distance, wherein the shifting distance is computed as the moving speed of the cropping region at the current time instance multiplied by the difference in time between the current and last time instances.

8. The process of claim 3, wherein the process action of mechanically tracking the person or object of interest by mechanically panning the video camera, comprises the actions of:

(a) determining if any part of the motion segment for the current time instance comes within a prescribed distance of either one of the lateral side boundaries of the last frame captured by the video camera;

(b) whenever any part of the motion segment for the current time instance falls within the prescribed distance of either one of the lateral side boundaries of the last frame captured by the video camera, determining if a mechanical panning operation has been performed in the past within a prescribed minimum time interval;

(c) whenever a mechanical panning operation has not been performed in the past within the prescribed minimum time interval, computing a mechanical panning distance for the current camera zoom level and mechanically panning the video camera over the computed mechanical panning distance in the direction that will bring the center of the next video frame to be captured by the video camera closer to the person of object being tracked; and (d) whenever a mechanical panning operation has not been performed in the past within the prescribed minimum time interval, at each time instance prior to reaching the prescribed minimum time interval, the frame of the video being generated is created using the cropping region location associated with the last previous time instance, and when the prescribed minimum time interval is reached, computing a mechanical panning distance for the current camera zoom level and mechanically panning the video camera over the computed mechanical panning distance in the direction that will bring the center of the next video frame to be captured by the video camera closer to the person of object being tracked.

9. The process of claim 4, further comprising process actions performed prior to performing the process action of establishing the location of the cropping region, said process actions comprising:

determining if a secondary area segment, defined as a lateral segment extending between the lateral side boundaries of a secondary region of interest in the scene specified by the user, is completely contained within the last frame captured by the video camera;

whenever the secondary area segment is not completely contained within the last frame captured by the video camera, determining if the last-computed cropping segment location is closer to the secondary area segment than the cropping segment location computed for the last previous time instance;

whenever the last-computed cropping segment location is closer to the secondary area segment than the cropping segment location computed for the last previous time instance, determining if the last-computed motion segment will likely remain within the FOV of the frame of the video captured after a mechanical pan operation is performed; and whenever the last-computed motion segment will likely remain within the FOV of the frame of the video captured after a mechanical pan operation is performed, computing a mechanical panning distance for the current camera zoom level and mechanically panning the video camera over the computed mechanical panning distance in a direction toward the secondary region of interest.

10. The process of claim 4, further comprising a process action of controlling the zoom level of the video camera on a periodic basis using the amount of movement of the person or object being tracked to decide if the zoom level should be changed and by how much.

11. The process of claim 10, wherein the process action of controlling the zoom level comprises the actions of:

setting the video camera to a prescribed initial zoom level at the beginning of a tracking session; and at the end of each prescribed-length zoom period during the tracking session,
compute the total horizontal distance that the cropping region moved during the last zoom period,
compute the zoom level that is to be used for the next zoom period based on the total distance computed for the last zoom period, and
zoom the video camera to the computed zoom level if it is different from the level used in the last zoom period.

12. A computer storage medium having computer-executable instructions stored thereon for performing the process actions recited in claim 1.

13. A system for generating a video that tracks a person or object of interest moving in a scene, comprising:

a digital video camera disposed so as to view a part of the scene and which is capable of mechanically panning so as to view other parts of the scene;

a general purpose computing device; and
a computer program comprising program modules executable by the computing device, wherein the computing device is directed by the program modules of the computer program to,
  track the movement of a person or object of interest in a scene,
  determine if the movement of the person or object being tracked has been detected within a prescribed period of time,
  whenever the movement has not been detected within the prescribed period of time, zoom the video camera out to a prescribed minimum level so as to maximize the field of view,
  whenever the movement has been detected within the prescribed period of time,
    produce frames of the video being generated using prescribed sized sub-regions of frames captured by the video camera wherein each sub-region shows at least part of the person or object of interest, and wherein said sub-region in each video camera frame is identified by tracking the person or object of interest via digital or mechanical panning based on the detected motion, wherein digital panning is used whenever the detected motion indicates the person or object being tracked is shown completely within a prescribed-sized portion a frame captured by the video camera and mechanical panning is used when the detected motion indicates the person or object being tracked is not shown completely within the prescribed-sized portion the frame captured by the video camera.

14. The system of claim 13, wherein each prescribed-sized sub-region is a cropping region have a user-specified height and width, and a fixed user-specified vertical position within the video frames captured by the camera, and wherein the program module for producing frames of the video using digital panning comprises, for each frame produced, sub-modules for:
  determining if the detected motion indicates the person or object being tracked is shown completely within, partial within or completely outside a safety region in the last frame captured by the video camera, wherein said safety region is defined as a sub-region in the last-captured video frame corresponding to a sub-region of a previously captured frame used to produce the last previous frame of the video being generated, that has lateral side boundaries which are offset in from the lateral side boundaries of the cropping region associated with said previously captured frame by a prescribed distance;
  whenever the detected motion indicates the person or object being tracked is shown completely within a safety region in the last frame captured by the video camera, establishing the location of the cropping region associated with the last-captured frame as the same as the cropping region associated with said previously captured frame;
  whenever the detected motion indicates the person or object being tracked is partially within the safety region in the last frame captured by the video camera but has not been for a prescribed period of time, establishing the location of the cropping region associated with the last-captured frame as the same as the cropping region associated with said previously captured frame; and
  whenever the detected motion indicates the person or object being tracked is partially within the safety region in the last frame captured by the video camera and has been for the prescribed period of time, or is completely outside the safety region, establishing the location of the cropping region in the last-captured frame by,
    identifying the side of the safety region in the last-captured frame that the detected motion indicates the person or object being tracked is adjacent to or straddling, and computing the separation distance between the corresponding side of a lateral segment representing the width of the person or object being tracked as indicated by the detected motion and the identified side of the safety segment, and
    establishing the cropping region location as the location of the cropping region established for said previously captured frame shifted in the direction of the identified side of the safety segment by a shifting distance, wherein the shifting distance is defined as a moving speed of the cropping region associated with the last-captured frame multiplied by the difference in time between the capture of last-captured frame and said previously captured frame.

15. The system of claim 14, wherein the moving speed of the cropping region associated with the last-captured frame comprises the lesser of a prescribed maximum velocity, and the moving speed of the cropping region associated with said previously captured frame, increased by the product of a prescribed acceleration and the difference in time between the capture of last-captured frame and said previously captured frame and given a positive or negative sign to match that of said separation distance.

16. The system of claim 13, wherein the program module for producing frames of the video using mechanical panning comprises, for each frame produced, sub-modules for:
  determining if a mechanical panning operation has been performed in the past within a prescribed minimum time interval;
  whenever a mechanical panning operation has not been performed in the past within the prescribed minimum time interval, computing a mechanical panning distance for the current camera zoom level and mechanically panning the video camera over the computed mechanical panning distance in the direction that will bring the center of the next video frame to be captured by the video camera closer to the person of object being tracked; and
  whenever a mechanical panning operation has been performed in the past within the prescribed minimum time interval, waiting until the prescribed minimum time interval has been reached and then computing a mechanical panning distance for the current camera zoom level and mechanically panning
  the video camera over the computed mechanical panning distance in the direction that will bring the center of the next video frame to be captured by the video camera closer to the person of object being tracked.

17. The system of claim 16, wherein the sub-module for waiting until the prescribed minimum time interval has been reached, comprises, at each time instance when a frame of the video being generated is created prior to reaching the prescribed minimum time interval, creating the frame of the video being generated using the cropping region location associated with the last previous time instance when a frame of the video was generated.

18. The system of claim 13, wherein the program module for producing frames of the video using mechanical panning comprises, for each frame produced, sub-modules for:
  computing a mechanical panning distance for the current camera zoom level; and mechanically panning the video camera over the computed mechanical panning distance in the direction that will bring the center of the next video frame to be captured by the video camera closer to the person of object being tracked.

19. A system for generating a video that tracks a person or object of interest moving in a scene, comprising:

a digital video camera disposed so as to view a part of the scene and which is capable of mechanically panning so as to view other parts of the scene;

a general purpose computing device; and a computer program comprising program modules executable by the computing device, wherein the computing device is directed by the program modules of the computer program to, detect movement of the person or object being tracked, produce frames of the video being generated using prescribed-sized sub-regions of frames captured by the video camera wherein each sub-region shows at least part of the person or object of interest, and wherein said sub-region in each video camera frame is identified by tracking the person or object of interest via digital or mechanical panning based on the detected motion, wherein digital panning is used whenever the detected motion indicates the person or object being tracked is shown completely within a prescribed-sized portion a frame captured by the video camera and mechanical panning is used when the detected motion indicates the person or object being tracked is not shown completely within the prescribed-sized portion the frame captured by the video camera, and wherein, each prescribed-sized sub-region is a cropping region have a user-specified height and width, and a fixed user-specified vertical position within the video frames captured by the camera, and wherein producing frames of the video using digital panning comprises, for each frame produced, determining if the detected motion indicates the person or object being tracked is shown completely within, partial within or completely outside a safety region in the last frame captured by the video camera, wherein said safety region is defined as a sub-region in the last-captured video frame corresponding to a sub-region of a previously captured frame used to produce the last previous frame of the video being generated, that has lateral side boundaries which are offset in from the lateral side boundaries of the cropping region associated with said previously captured frame by a prescribed distance, whenever the detected motion indicates the person or object being tracked is shown completely within a safety region in the last frame captured by the video camera, establishing the location of the cropping region associated with the last-captured frame as the same as the cropping region associated with said previously captured frame, whenever the detected motion indicates the person or object being tracked is partially within the safety region in the last frame captured by the video camera but has not been for a prescribed period of time, establishing the location of the cropping region associated with the last-captured frame as the same as the cropping region associated with said previously captured frame, and whenever the detected motion indicates the person or object being tracked is partially within the safety region in the last frame captured by the video camera and has been for the prescribed period of time, or is completely outside the safety region, establishing the location of the cropping region in the last-captured frame by, identifying the side of the safety region in the last-captured frame that the detected motion indicates the person or object being tracked is adjacent to or straddling, and computing the separation distance between the corresponding side of a lateral segment representing the width of the person or object being tracked as indicated by the detected motion and the identified side of the safety segment, and establishing the cropping region location as the location of the cropping region established for said previously captured frame shifted in the direction of the identified side of the safety segment by said separation distance.

* * * * *